(12) United States Patent
Kavanagh

(10) Patent No.: US 12,554,685 B2
(45) Date of Patent: *Feb. 17, 2026

(54) CONCURRENT WRITE OPERATIONS FOR USE WITH MULTI-THREADED FILE LOGGING

(71) Applicant: Chicago Mercantile Exchange Inc., Chicago, IL (US)

(72) Inventor: Kyle D. Kavanagh, Chicago, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/889,724

(22) Filed: Sep. 19, 2024

(65) Prior Publication Data

US 2025/0013611 A1  Jan. 9, 2025

Related U.S. Application Data

(63) Continuation of application No. 18/212,370, filed on Jun. 21, 2023, now Pat. No. 12,124,415, which is a continuation of application No. 17/582,066, filed on Jan. 24, 2022, now Pat. No. 11,726,963, which is a continuation of application No. 16/835,881, filed on Mar. 31, 2020, now Pat. No. 11,269,814, which is a
(Continued)

(51) Int. Cl.
| | |
|---|---|
| *G06F 7/00* | (2006.01) |
| *G06F 12/02* | (2006.01) |
| *G06F 16/13* | (2019.01) |
| *G06F 16/17* | (2019.01) |
| *G06F 16/176* | (2019.01) |

(52) U.S. Cl.
CPC ...... *G06F 16/1774* (2019.01); *G06F 12/0284* (2013.01); *G06F 16/13* (2019.01); *G06F 16/1734* (2019.01); *G06F 2212/1016* (2013.01)

(58) Field of Classification Search
CPC .. G06F 16/1774; G06F 12/0284; G06F 16/13; G06F 16/1734; G06F 2212/1016
See application file for complete search history.

(56) References Cited

U.S. PATENT DOCUMENTS 5,408,644 A * 4/1995 Schneider ........... G06F 12/0866
711/E12.04
5,727,203 A * 3/1998 Hapner ..................... G06F 9/52
711/E12.036
(Continued)

OTHER PUBLICATIONS

Extended European Search Report, from EP Application No. EP 181834787, Nov. 9, 2018, EP.
(Continued)

*Primary Examiner* — Mohammed R Uddin
(74) *Attorney, Agent, or Firm* — Lempia Summerfield Katz LLC

(57) ABSTRACT

A data storage system for use with a multi-threaded processing system receives concurrent requests to store data to a common data store, and efficiently and securely swaps an active data store for a new data store while avoiding conflicts arising from multiple threads attempting to swap a same data store and minimizing reliance on operations that re-attempt actions upon failure of an attempted action, thereby improving performance of the data storage system and also the multi-threaded processing system.

25 Claims, 15 Drawing Sheets

Related U.S. Application Data continuation of application No. 15/663,360, filed on Jul. 28, 2017, now Pat. No. 10,642,797.

(56) References Cited

U.S. PATENT DOCUMENTS

| | | | |
|---|---|---|---|
| 5,991,845 A * | 11/1999 | Bohannon | G06F 9/526 710/200 |
| 6,006,289 A * | 12/1999 | James | G06F 13/28 370/431 |
| 6,101,568 A | 8/2000 | Richardson | |
| 6,389,460 B1 * | 5/2002 | Stewart | H04L 67/62 709/219 |
| 7,010,662 B2 * | 3/2006 | Aasheim | G06F 12/0246 711/E12.008 |
| 7,039,610 B2 | 5/2006 | Morano et al. | |
| 7,631,122 B1 * | 12/2009 | Wyatt | G06F 9/546 710/52 |
| 7,831,491 B2 | 11/2010 | Newell et al. | |
| 8,775,766 B2 * | 7/2014 | LeGendre | G06F 3/0665 711/170 |
| 8,793,443 B2 * | 7/2014 | Rizzo | G06F 3/0631 711/170 |
| 8,965,936 B2 * | 2/2015 | Ismail | G06F 3/0659 707/812 |
| 9,489,293 B2 * | 11/2016 | Kimmel | G06F 3/0608 |
| 2004/0039887 A1 * | 2/2004 | Gautney | H04L 67/125 711/159 |
| 2005/0039049 A1 | 2/2005 | Chang et al. | |
| 2005/0096999 A1 | 5/2005 | Newell et al. | |
| 2005/0203826 A1 | 9/2005 | Farrell et al. | |
| 2005/0273568 A1 * | 12/2005 | Blandy | G06F 12/023 711/170 |
| 2006/0015872 A1 * | 1/2006 | Pohl | G06F 9/4843 718/100 |
| 2006/0253681 A1 * | 11/2006 | Zohar | G06F 3/0665 711/172 |
| 2007/0247466 A1 * | 10/2007 | Kumazawa | G06T 1/20 345/506 |
| 2008/0172526 A1 * | 7/2008 | Verma | G06F 3/0611 711/170 |
| 2008/0183777 A1 * | 7/2008 | Xi | G06F 16/10 |
| 2009/0049449 A1 * | 2/2009 | Varadarajan | G06F 9/5016 718/104 |
| 2009/0287899 A1 * | 11/2009 | Li | G06F 9/5016 711/E12.001 |
| 2010/0115009 A1 * | 5/2010 | Callahan | G06F 16/10 707/825 |
| 2011/0060887 A1 * | 3/2011 | Thatcher | G06F 3/064 711/E12.001 |
| 2012/0159502 A1 * | 6/2012 | Levin | G06F 9/5016 718/104 |
| 2012/0272035 A1 * | 10/2012 | Seno | G06F 13/4022 711/E12.002 |
| 2013/0111474 A1 | 5/2013 | Agarwal et al. | |
| 2013/0145106 A1 | 6/2013 | Kan | |
| 2013/0346705 A1 * | 12/2013 | Pyla | G06F 12/0804 711/142 |
| 2014/0006243 A1 | 1/2014 | Boudreault et al. | |
| 2014/0040556 A1 * | 2/2014 | Walker | G06F 9/5016 711/130 |
| 2014/0052946 A1 * | 2/2014 | Kimmel | G06F 3/0631 711/159 |
| 2015/0113223 A1 * | 4/2015 | Brown | G06F 12/0893 711/133 |
| 2015/0127513 A1 | 5/2015 | Studnitzer et al. | |
| 2016/0328435 A1 | 11/2016 | Kavanagh et al. | |
| 2017/0034064 A1 * | 2/2017 | Everhart | G06F 9/5011 |
| 2017/0068618 A1 * | 3/2017 | Akiyama | G06F 12/0871 |
| 2023/0064693 A1 * | 3/2023 | Wang | G06F 12/0868 |
| 2023/0082658 A1 * | 3/2023 | Klasson | G16H 40/20 455/456.1 |
| 2024/0192988 A1 * | 6/2024 | Maynard | G06F 16/24532 |
| 2024/0291835 A1 * | 8/2024 | Sethi | H04L 63/1425 |
| 2025/0181649 A1 * | 6/2025 | Penumatsa | G06F 16/906 |

OTHER PUBLICATIONS

Gil Tene, WirterReaderPhaser: A Story About a New (?) Synchronization Primitive, Stuff Gil Says, 14 pages, Nov. 16, 2014.
Github, "Efficient Reliable Unicast and Multicast Message Transport", real-logic / Aeron, 4 pages, https://github.com/real-logic/Aeron, 2015.
International Search Report and Written Opinion, from PCT/US16/31176, Aug. 11, 2016, WO.

* cited by examiner

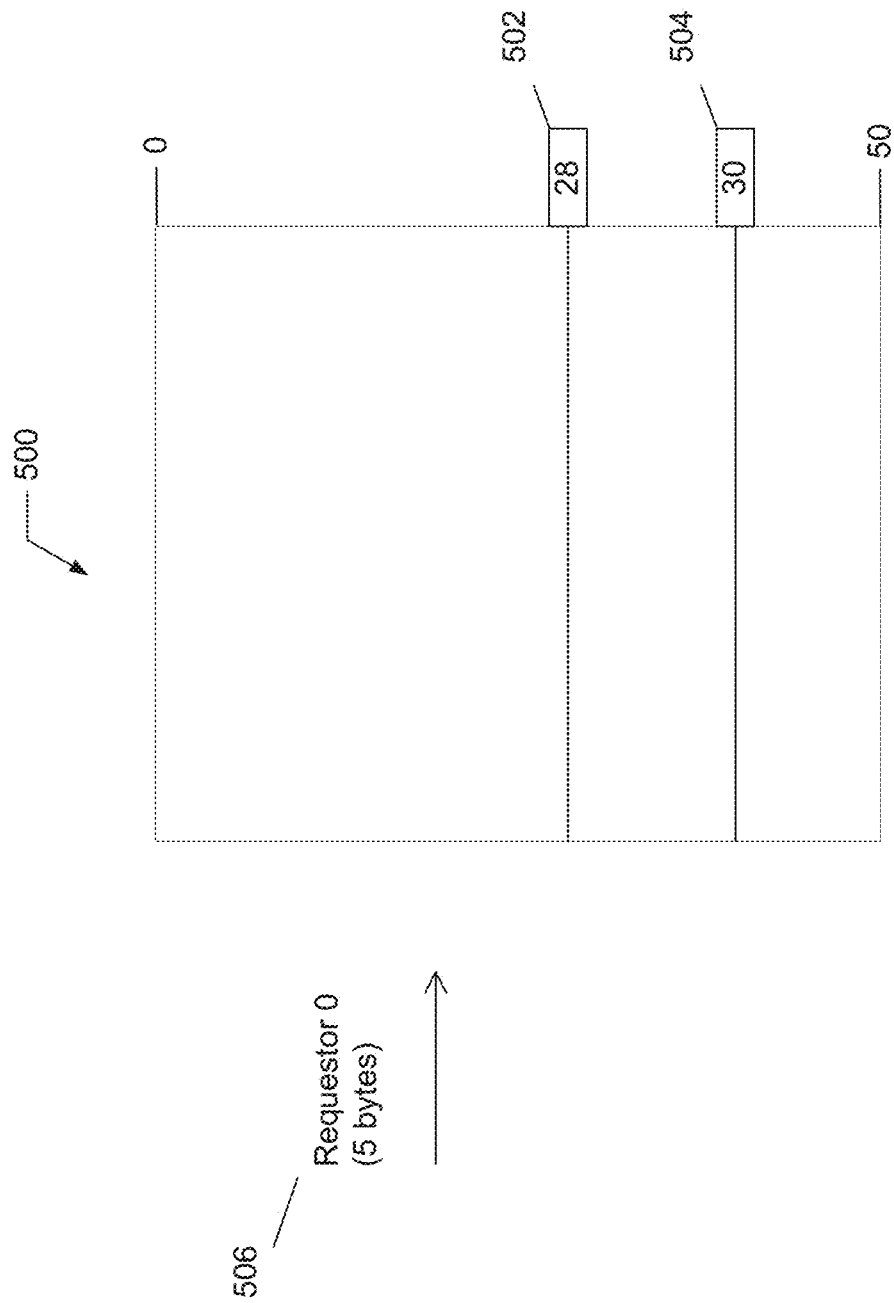

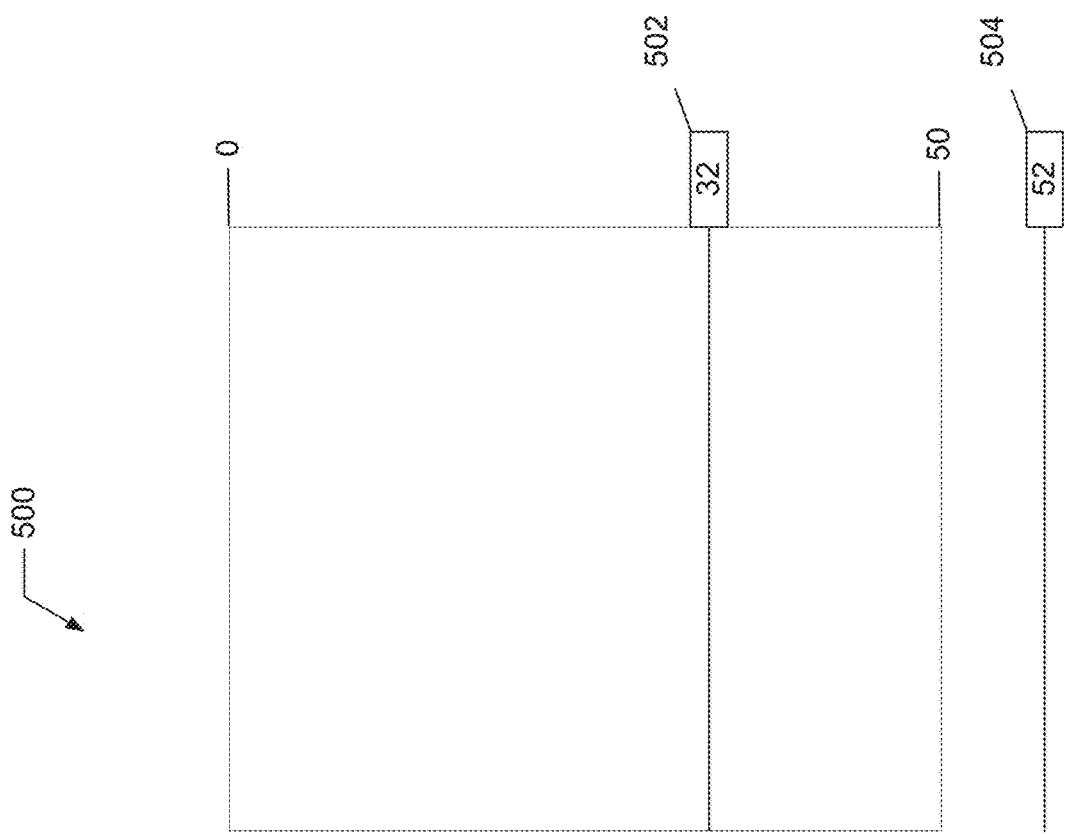

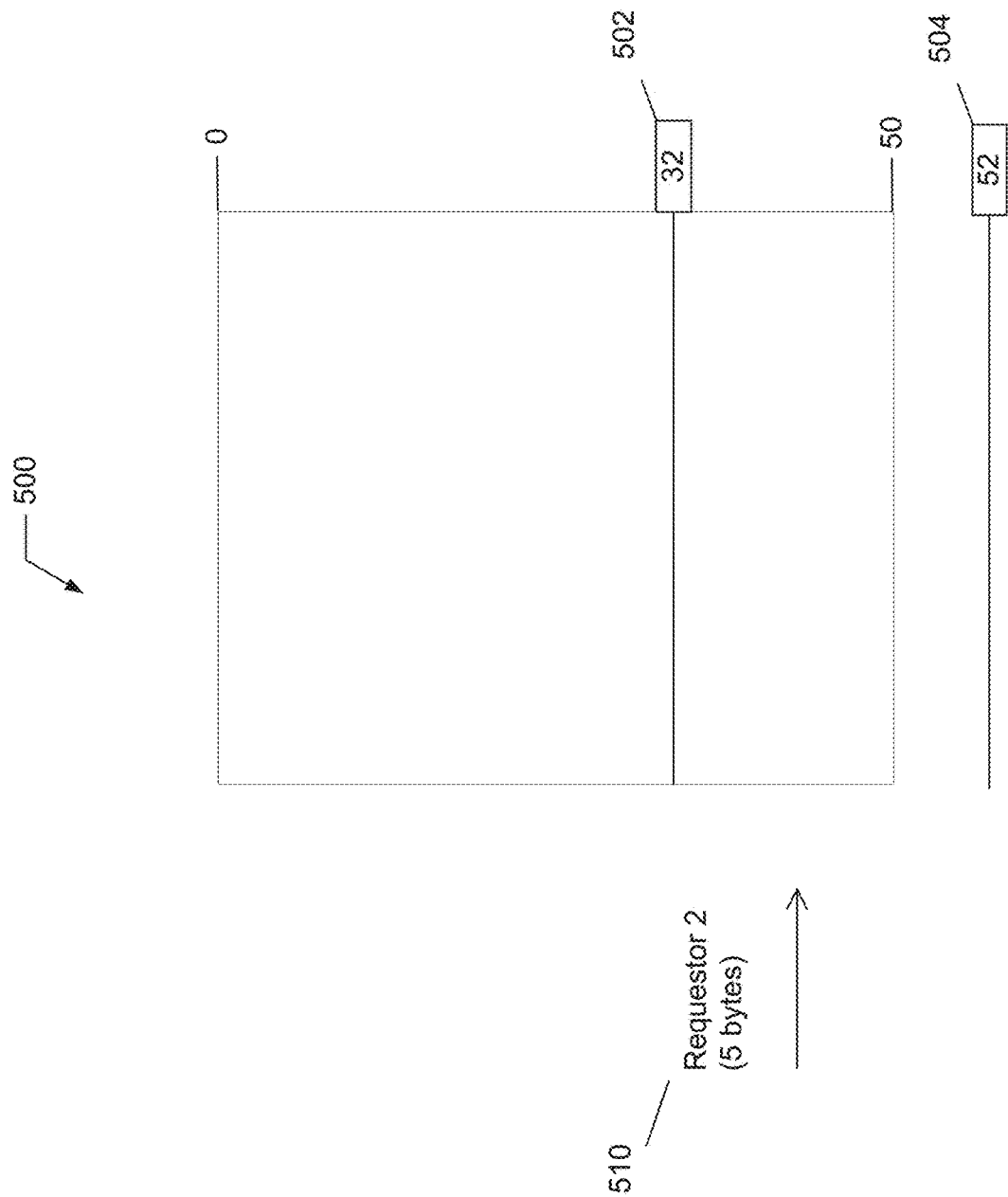

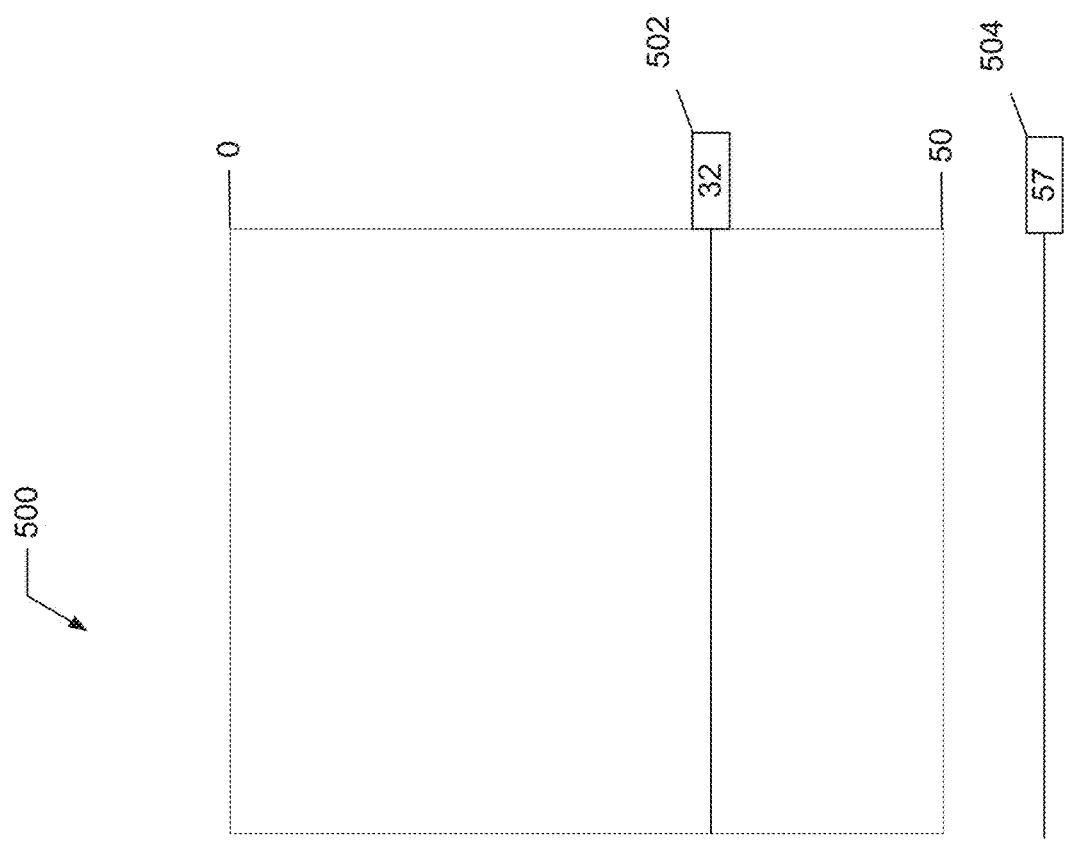

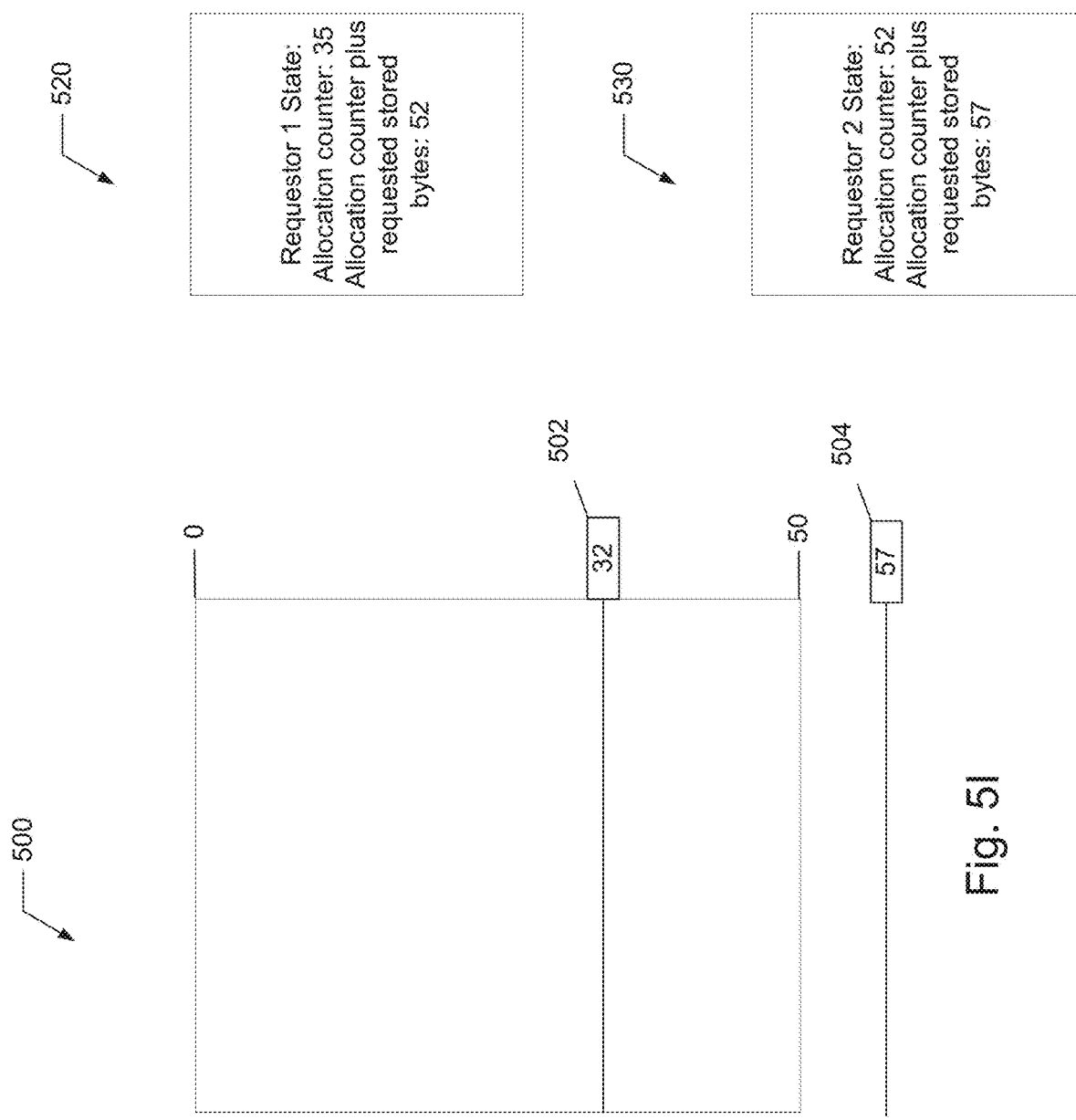

CONCURRENT WRITE OPERATIONS FOR USE WITH MULTI-THREADED FILE LOGGING

REFERENCE TO RELATED APPLICATIONS

This application claims priority to, and the benefit as a continuation under 37 C.F.R. 1.53 (b) of U.S. patent application Ser. No. 18/212,370, filed Jun. 21, 2023, now U.S. Pat. No. 12,124,415, which claims priority to, and the benefit as a continuation under 37 C.F.R. 1.53 (b) of U.S. patent application Ser. No. 17/582,066, filed Jan. 24, 2022, now U.S. Pat. No. 11,726,963, which claims priority to, and the benefit as a continuation under 37 C.F.R. 1.53 (b) of U.S. patent application Ser. No. 16/835,881, filed Mar. 31, 2020, now U.S. Pat. No. 11,269,814, which claims priority to, and the benefit as a continuation under 37 C.F.R. 1.53 (b) of U.S. patent application Ser. No. 15/663,360, filed Jul. 28, 2017, now U.S. Pat. No. 10,642,797, the entirety of all of which are incorporated by reference herein and relied upon.

BACKGROUND

Many computing systems execute multiple threads simultaneously, or concurrently. Multiple threads or multiple processes may attempt to write data simultaneously, or concurrently, to a common data store or memory. When different threads attempt to write or otherwise log data to a common file or data store simultaneously, or otherwise concurrently, those threads may conflict or otherwise compete with each other, causing the system to experience data loss, data corruption, and/or delays. Some systems attempt to overcome such conflicts by providing a separate file where each thread can write data, which increases the amount of memory and storage needed. Other systems attempt to overcome thread conflicts by locking threads and enabling only one thread to write to a data store at any given point in time, but such thread-locking techniques suffer from a decrease in productivity and efficiency.

BRIEF DESCRIPTION OF THE DRAWINGS

FIG. 5A-5I depict examples of data requests written to a data store, according to some embodiments.

DETAILED DESCRIPTION

Figure 1:
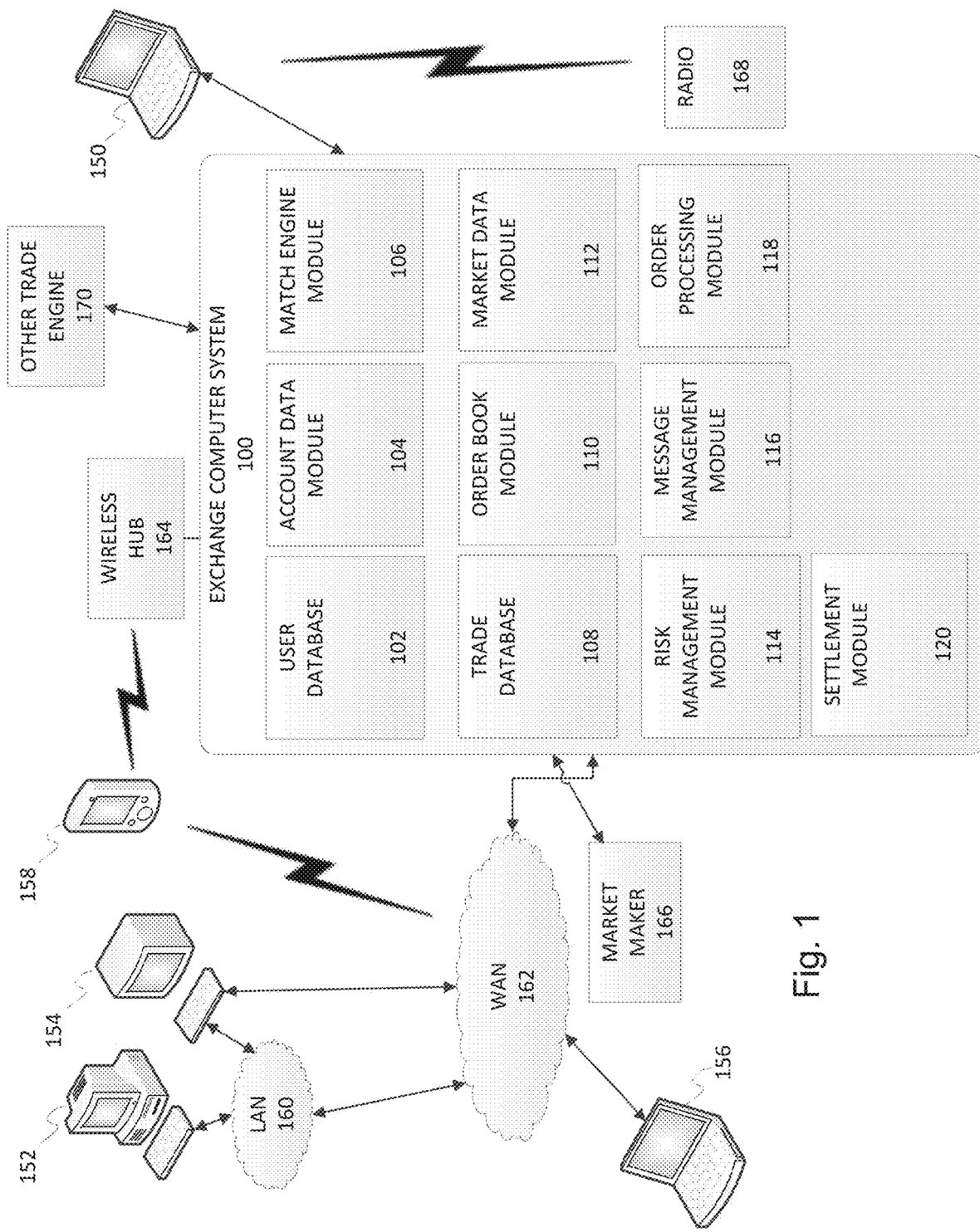
FIG. 1 depicts a computer network system, according to some embodiments.

The disclosed embodiments generally relate to methods and systems for allowing concurrent access, e.g. write/store operations, to a data structure, e.g. a file, memory, or other data store, by multiple processes or threads and, in particular, for allowing concurrent, or otherwise substantially simultaneously, appending of data to a file thereby. A thread is a section of software code or program instructions being processed. A software application includes at least one thread, but may include multiple threads that are processed concurrently, and may all attempt to store data to a common data store. Each requestor/process/thread requests the amount of space it needs to append or store its data. Upon receiving such requests, the disclosed embodiments attempt to allocate or reserve the requested amount of space and, when it is determined that a write request will exceed the available space in a data store, determine which requesting process/thread should be responsible for ensuring that all data is written to the active data store and designating/selecting a new data store for subsequent write requests, thus avoiding conflicts between threads that may each otherwise attempt to clean or "roll" the file as discussed herein. The disclosed embodiments accordingly efficiently handle creation/opening of new files, referred to as "file rolling," when data that should be stored cannot be stored in the current file's remaining available capacity. The disclosed embodiments may provide mechanisms which ensure minimal delay and mitigate multi-thread conflict when opening or otherwise creating a new file, or new data store.

It should be appreciated that the disclosed embodiments may operate with files or other resources having an unlimited size, or otherwise characterized by a size large enough to hold all possible data that could be stored in a particular implementation, and thereby not requiring another file or resource.

The disclosed embodiments may include a data storage system for periodic logging of data regarding the operational state of a computer system, such as a match engine of an electronic trading system, whereby multiple threads, processes or other programs, referred to as "loggers" or "logging threads", monitor various portions of the operation of the computer system and record their observations, and/or other data indicative thereof, in a log data file or other data structure. It should be appreciated that the more granular the monitoring, i.e. the more monitoring threads/process that can be implemented to monitor more parts of the system and/or the rate or frequency at which those parts may be monitored and data indicative thereof recorded, the more useful the overall monitoring function may be. Each thread/process may be monitoring a different portion of the system and the computer system may be operating at high speed, thereby generating a significant amount of monitored data in a short amount of time, all of which may be written by multiple threads to a same file or data store.

While monitoring of system operation may be considered tangential to the overall function of a system, the performance of the monitoring threads/processes may nevertheless impact the performance of the system because those processes/threads typically use the same resources, e.g. processor/CPU, memory, etc., as the system being monitored. Therefore, it may be desirable that the monitoring threads/processes operate efficiently and with minimal impact on the operation of the system. In particular, as the operation of appending data to a data file may be a relatively time/resource consuming operation, the disclosed embodiments improve the performance of the monitoring threads/processes, and thereby improve the performance of the system being monitored, by minimizing the contention among the monitoring processes/threads for access to the data store/file in which the monitored data is stored to append their monitored data to an active data store, and by minimizing uncertainty about which process/thread should roll the file so that subsequent requests are stored in a new data store.

Using the disclosed embodiments, each process/thread can determine if it is or is not the one thread that should roll the file and select a new file for subsequent data write operations, and, based on these determinations, only that one thread will roll the file, thus eliminating file rolling conflicts which can corrupt the data or severely slow down the system.

In one embodiment, the system may comprise a match engine of an electronic trading system and the monitoring threads/processes may continuously monitor and record time stamp and address data indicative of the timing of particular operations/functions/milestones/states of the system for the purpose of system performance evaluation, problem/defect resolutions, historical data analysis, operational scenario reconstruction, regulatory or administrative audit, or other purpose. However, it will be appreciated that disclosed embodiments may be utilized in conjunction with any system or multi-threaded implementation where multiple processes/threads need to append data to a shared resource, e.g. file or other data store.

As used herein, the terms concurrent and/or substantially simultaneously refer to the ability of one thread process to commence, but not necessarily complete, its operation to append data to a file or other resource before another process/thread completes a previously commenced operation to append data to the same file or resource, or otherwise where the operations may overlap in time.

The disclosed embodiments may be implemented separately from, or as part of, the hardware and/or an operating system upon which the monitored system is implemented, as part of the monitored system, as part of the monitoring/logging system, or combinations thereof and all such implementations are contemplated. In one embodiment, the disclosed functionality may be implemented as part of a file management system or other supervisory process to which other threads/processes request file access. The disclosed embodiments may be implemented, as described below, as computer program code stored in a memory or other volatile or non-volatile data storage device and/or as a hardware component such as a programmable or reprogrammable logic device or an application specific integrated circuit. The disclosed embodiments may be implemented as a data storage system that stores/records data about a monitored system.

The disclosed embodiments particularly relate to allowing multiple threads/processes to concurrently append new data to a file, i.e. add new data to, and thereby, increase the size of the file. Using the disclosed embodiments, the output of multiple threads may be captured in a single file or set of files with minimal impact on the performance of the system being monitored as was described. Where the output of the threads may be interrelated and characterized by an order, e.g. sequence or time order, in which the output was generated by each thread, capturing to a single file, or set of files, may require less post processing of the collected data.

For example, an alternative solution to the resource contention issue described herein may be to provide a separate resource/file for each thread to write to. However, where the data is interrelated such via an order, such as a time order or sequence, these separate files may need to be post processed to combine the data for subsequent analysis or processing. This may not be a trivial task. Further, the maintenance of multiple open files by the operating system on which the monitoring is occurring, may itself cause performance degradation.

Another solution to the resource contention issue described herein may be to only enable one thread to write, at any one time, to a common resource/file. However, such locking of all threads except for the writing thread may significantly degrade system performance.

In one embodiment, systems and methods are disclosed for storing data related to monitoring operations of an electronic trading system using a monitoring system having multiple logging processes/threads monitoring various portions of the electronic trading system and concurrently storing the monitored data in a common log file or other data store in accordance therewith.

The disclosed embodiments may determine which of many requestors should be responsible for cleaning a data store and rolling additional/subsequent data write operations to a new data store. The disclosed embodiments advantageously allow multiple threads to simultaneously write data to a common data store, and enable selection of a new data store when an active data store is full or almost full, without the multiple threads conflicting with each other while writing data or while rolling the file.

In one embodiment, an individual file's state may be represented by independent counters, e.g., an allocation counter, indicative of which portions of a data store have been allocated for data storage, and an acknowledgement counter, indicative of portions of a data store where data has actually been written in the data store.

A counter may be implemented in hardware, e.g., a counting device, or may be implemented in software and may that count and be characterized by current values, increments, etc. For example, a counter may increment or decrement a value by an increment/decrement amount. The value may be an address/pointer that points to a position in the data store. Or the value may be an offset, added to a base value (which in some cases could be zero), to calculate a position in the data store.

In one embodiment, a value of an allocation counter may be returned to a requestor and incremented atomically. In another embodiment, the value of an allocation counter may be returned to a requestor after the value of the allocation counter is incremented. It should be understood that an atomic operation or multiple operations that operate together atomically are operations that are either all performed or not performed at all. For example, if two steps are performed as an atomic operation, each of the two steps is committed to memory and is allowed to change the state of the system only if the other step is also committed to memory and is allowed to change the state of the system. An operation (or set of operations) is atomic if it appears to the rest of the system to occur instantaneously. Atomicity is a guarantee of isolation from interrupts, signals, concurrent processes and threads. An operation that is atomic may also be referred to as linearizable, indivisible or uninterruptible. A thread acting on shared memory is atomic if it completes in a single step relative to other threads. For example, when an atomic store is performed on a shared variable, no other thread can observe the modification half-complete. When an atomic load is performed on a shared variable, it reads the entire value as it appeared at a single moment in time. Non-atomic loads and stores do not provide such guarantees.

The disclosed embodiments also reduce the reliance on compare and swap ("CAS") type operations, or similar operations, which are operations that attempt to perform an action, where the attempt may be successful or may fail, and where if the attempt to perform an action fails, the operation re-attempts to perform the same action, until the action can be successfully performed. Implementing CAS-type operations may be inefficient because CAS-type operations are often implemented where there is a high probability (e.g., close to 50% in some cases) that the attempted action will fail, causing the CAS-type operation to attempt to perform the action again.

U.S. Patent Publication No. 2016/0328435 entitled "Thread Safe Lock-Free Concurrent Write Operations For Use With Multi-Threaded In-Line Logging" and filed on May 8, 2015 ("the '435 Publication"), assigned to the assignee of the present application, the entire disclosure of which is incorporated by reference herein and relied upon, describes embodiments for allowing multiple threads to concurrently append new data to a file that implement CAS operations.

Due to very nature of CAS-type operations, i.e., because they are implemented where an attempted action is expected to fail during at least some of the attempts, they increase the amount of software loops executed by the processes, and may be inefficient. In one embodiment, the disclosed embodiments minimize the reliance on potentially repeating software loops and improve upon the speed and efficiency with which multiple threads can write to a common file or data store. By reducing the amount of potentially repeating software loops, the disclosed embodiments enable faster and more reliable data write operations.

In one embodiment, the data storage system does not implement CAS-type operations to allocate data, write data to the data store, or to swap old/used files. In another embodiment, the data storage system optionally implements one CAS-type operation to swap old/used files, but still does not implement CAS-type operations to allocate data, or to write data to the data store. The disclosed embodiments accordingly improve upon technologies that extensively implement CAS-type operations. The disclosed embodiments accordingly improve upon the technical field of file logging and/or data storage in a multi-threaded system, such as a multi-threaded monitoring system. At least some of the problems solved by the disclosed embodiments are specifically rooted in technology, where different threads/processes attempt to write to a shared data store, and where the data store may be of a fixed or variable size that is periodically closed and replaced by a new/different data store.

The disclosed embodiments described herein also improve the technology of data processing and computer implemented system performance and, in particular, the data storage system associated with logging of information, e.g., of a monitored system. By improving the mechanism for concurrent storage of data to a common data store, the disclosed embodiments eliminate the need for file locks or other synchronization/serialization techniques and/or reduce the reliance on operations that re-attempt actions upon failure of an attempted action, thereby improving performance of the data storage system and, thereby, the system about which data is recorded. Furthermore, the disclosed embodiments minimize delay incurred due to swapping the common data store, when it reaches its capacity, for a new data store which further improves the performance of the data storage system and, thereby, the system about which data is recorded. The disclosed embodiments provide the described performance improvements while allowing for the creation of a single log files containing the data from the multiple monitoring threads/processes. This alleviates the need, and the necessary resources, to post-process numerous log files in order to combine the thread/process output for further analysis. It will be appreciated that by improving the performance of the data storage system, the performance of the system about which data is recorded may be improved and/or additional and/or more granular monitoring may be performed without impacting the performance of the monitored system.

The disclosed embodiments improve data storage systems that allow for multi-thread logging in several ways. The disclosed embodiments facilitate ensuring that no two threads write to the same location/addresses in the file at the same time, that a file is not cleaned out of memory (flushed to disk and closed) by one thread while another thread attempts to write to the file, and that a file is not cleaned multiple times (e.g., by multiple different threads). The disclosed embodiments also allow a system to specify a maximum file size, such that the data store size does not exceed the specified maximum file size.

Exchange Computing System

The disclosed embodiments may be implemented in a data transaction processing system that processes data items or objects. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds.

For example, one exemplary environment where the disclosed embodiments may be desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513 Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see the '513 Publication.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
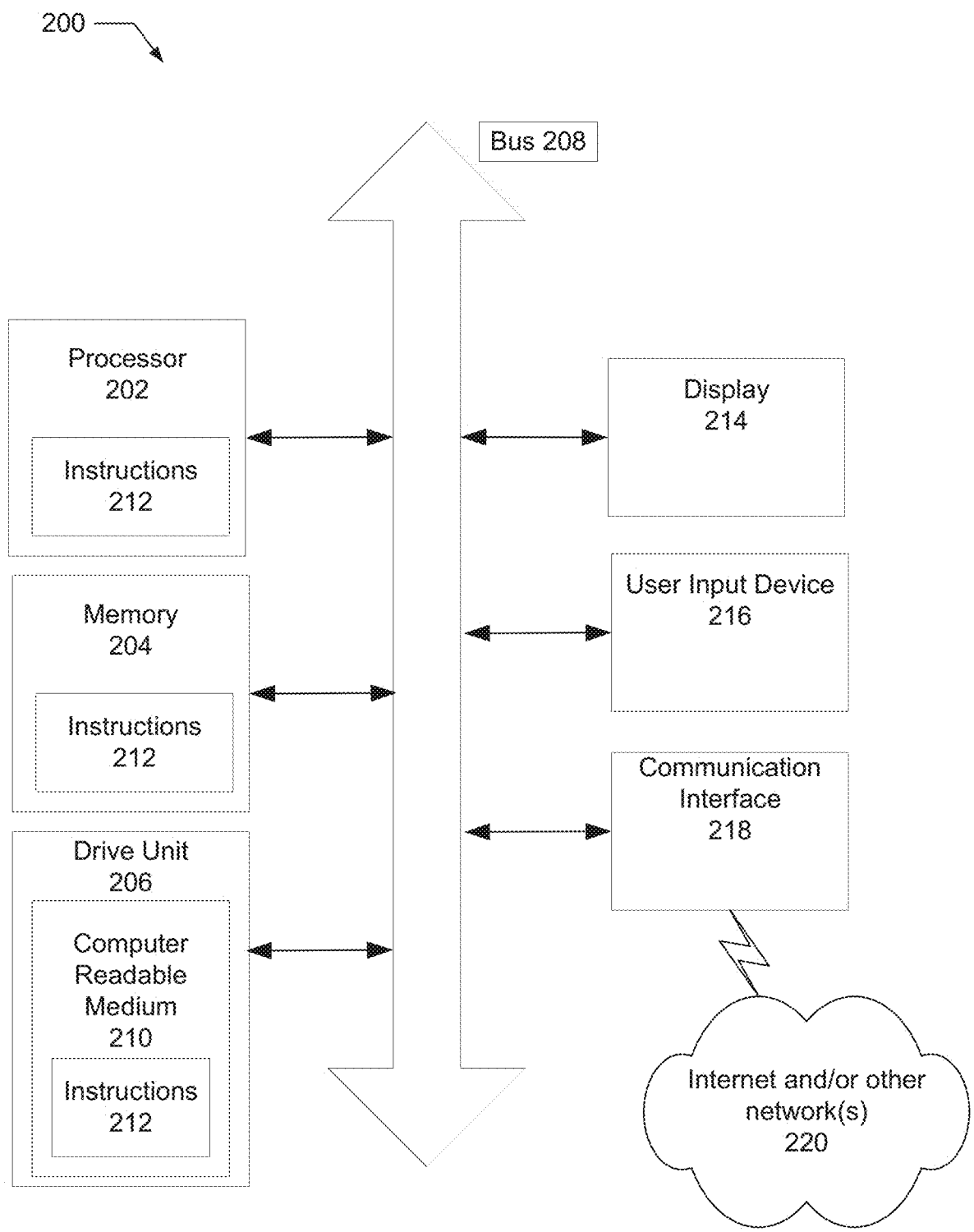
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

Data Storage System

The data storage system may be implemented by multiple operating processes, threads, tasks or other computer program code construct, logically distributed or otherwise coupled throughout the exchange computer system 100 to monitor different parts, e.g. modules, thereof and record data regarding the operation thereof in a log file or other data store. The data store may include one or more data files, records or other structures or resources for storing data. As described herein, the disclosed embodiments enable multiple threads/processes to append their data to the same data store, however that data store may change, e.g. a new data store may be provided once the storage capacity of the current data store is reached. For example, the data store may be a data file having a maximum capacity. As the threads/processes store data into the data file, the capacity of the data file is monitored. Once the capacity of the data file has been exhausted, or once it is determined that a thread's write request cannot fit in the available remaining capacity of an active data store, the data file is closed and a new data file is opened, referred to as "rolling", and the threads/processes continue to write their data to the new data file, as will be described. Accordingly, as used herein, the terms data store, data file, etc., may refer to the current data store or file, to which the multiple threads are currently storing their data, of a set of at least one data store or file, wherein each data store or file of the set may be created as needed and/or created in advance.

Figure 3:
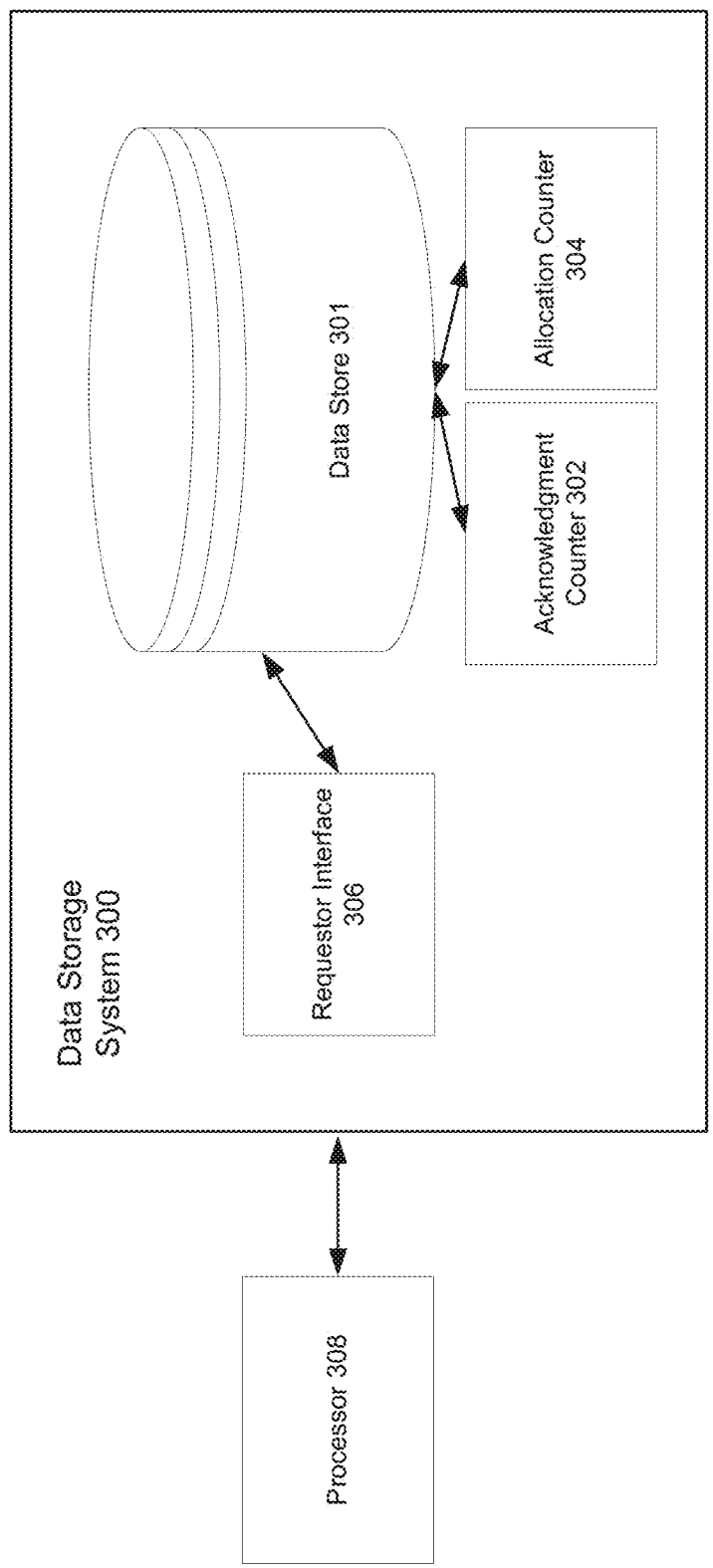
FIG. 3 depicts a block diagram for implementing concurrent store operations for multiple threads, according to some embodiments.

FIG. 3 illustrates an example data storage system 300, which in one embodiment is implemented as part of the exchange computer system 100 described herein. In particular, FIG. 3 shows a system 300 for controlling storage, i.e. appending, of data, such as log data, in a selected one of at least one data store 301, e.g. a data file or other data storage construct, coupled with a processor 308. The selected one of the at least one data store 301 may be stored in a memory 204 or elsewhere. The processor 308, memory 204 and/or data store 301 may be implemented by a processor 202 and a memory 204 as described herein with respect to FIG. 2.

The data store 301 may be associated with an acknowledgment counter 302 and an allocation counter 304. The acknowledgment counter 302 may be used to indicate the portions of the data store 301 that stores data, e.g., data has been written to the portions indicated by the acknowledgment counter 302. The allocation counter 304 may be indicative of portions of the data store 301 that have been allocated for data storage in response to requests to store data. Allocated portions of the data store 301 may not yet actually contain or store data.

The system 300 further includes a requestor interface 306, which may be implemented as a separate hardware component or as first logic 306 stored in the memory 204 and executable by the processor 202 to cause the processor 202 to communicate with requestors (not shown), e.g. one of the multiple threads which may attempt to store amounts of data, e.g., specified in bytes, in the data store 301. For example, the requestor interface 306 may receive requests to store data in the data store 301, and may transmit information about the data store, such as the state of the acknowledgment counter and allocation counter discussed below, to the one or more requestors/threads.

Figure 4:
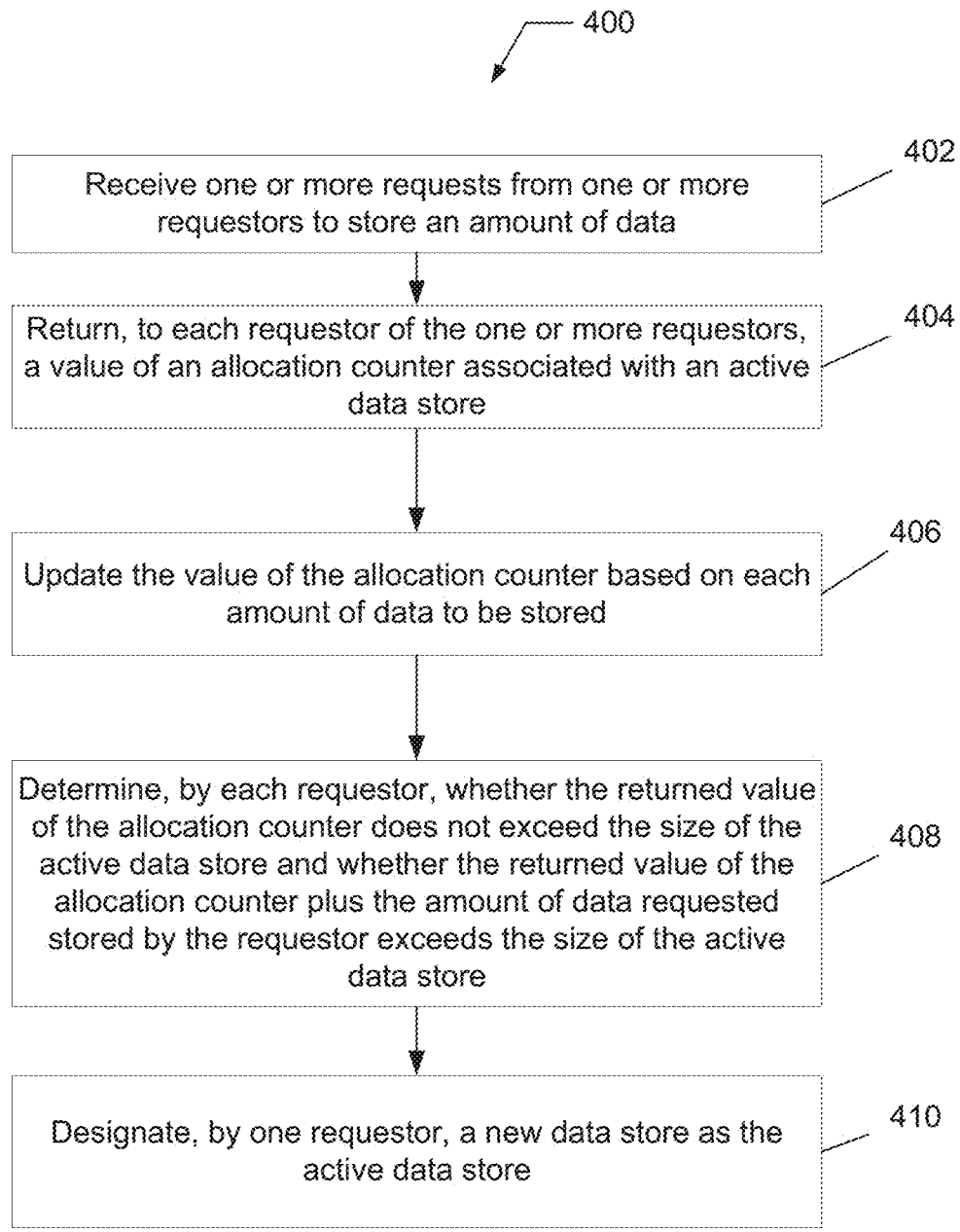
FIG. 4 depicts a high-level flowchart illustrating a method for storing data in one or more data stores, according to some embodiments.

FIG. 4 illustrates an example flowchart of a computer implemented method 400 for controlling storage of data in one or more data stores. Embodiments may involve all, more or fewer actions than the illustrated actions. The actions may be performed in the order or sequence shown, or in a different sequence.

At step 402, method 400 includes receiving one or more requests from one or more requestors to store an amount of data.

At step 404, method 400 includes returning, to each requestor of the one or more requestors, a value of an allocation counter associated with an active data store, the active data store having a size and associated with an acknowledgment counter.

At step 406, method 400 includes updating the value of the allocation counter based on each amount of data to be stored. For example, the allocation counter may be incremented by the amount of data to be stored in each request.

At step 408, method 400 includes determining, by each requestor, whether the returned value of the allocation counter does not exceed the size of the active data store and whether the returned value of the allocation counter plus the amount of data requested to be stored by the requestor exceeds the size of the active data store. It should be appreciated that in a multi-threaded system, multiple requestors may implement method 400 concurrently. Some of the requestors may obtain different determination results at step 408 than other requestors. In one embodiment, because the data storage system updates the allocation counter in response to each received request, and because of the arrangement and sequence of the steps disclosed herein, only one requestor will determine that the returned value of the allocation counter does not exceed the size of the active data store and that the returned value of the allocation counter plus the amount of data requested to be stored by the requestor exceeds the size of the active data store.

At step 410, method 400 includes upon determining, by any one requestor of the one or more requestors, that the returned value of the allocation counter does not exceed the size of the active data store and that the returned value of the allocation counter plus the amount of data requested to be stored by the one requestor exceeds the size of the active data store, designating, by the one requestor, a new data store as the active data store.

In one embodiment, method 400 may include incrementing the allocation counter by the amount of data requested to be stored by a requestor before returning the value of the allocation counter to the requestor, where the incrementing and the returning are performed atomically. In such an embodiment, the requestor may determine whether the returned value of the allocation counter minus the amount of data requested to be stored by the requestor does not exceed the size of the active data store and whether the returned value of the allocation counter (e.g., after it has been incremented by the amount of data requested to be stored by the requestor) exceeds the size of the active data store.

In one embodiment, method 400 includes causing, by the one requestor, the data store previously designated as the active data store to be cleaned.

In one embodiment, method 400 includes wherein the requestors other than the one requestor of the one or more requestors do not designate a new data store as the active data store or cause the data store previously designated as the active data store to be cleaned. For example, the data storage system may be configured as discussed herein so that only one requestor designates a new data store as the active data store or causes the data store previously designated as the active data store to be cleaned, In one embodiment, method 400 includes waiting, by the one requestor, until all the data from all the requests to store amounts of data received before the one requestor's request to store data has been stored in the data store previously designated as the active data store before causing the data store previously designated as the active data store to be cleaned.

In one embodiment, method 400 includes upon determining by another requestor of the one or more requestors that the returned value of the allocation counter plus the amount of data requested to be stored by the another requestor does not exceed the size of the active data store, commencing storing the data requested to be stored by the another requestor in the active data store. For example, if a requestor determines that the returned value of the allocation counter plus the amount of data requested to be stored by that requestor does not exceed the size of the active data store, then the active data store may not need to be swapped, and that requestor is allowed to commence storing its data to the active data store.

In one embodiment, method 400 includes upon determining by a requestor of the one or more requestors that the returned value of the allocation counter associated with the active data store exceeds the size of the active data store, re-submitting, by that requestor, that requestor's previously submitted request to store data. For example, if a requestor determines that the allocation counter is already past the end of the file, then that requestor did not cause the file to become full, and thus another requestor should be responsible for swapping the data store. Thus, the requestor that determines that the returned value of the allocation counter associated with the active data store exceeds the size of the active data store waits until a new file is available where data can be written. In one embodiment, method 400 includes receiving, by that requestor, a returned value of an allocation counter associated with a new data store; and upon determining by that requestor that the returned value of the allocation counter associated with the new data store plus the amount of data requested to be stored by the another requestor does not exceed the size of the new data store, commencing storing the data requested to be stored by that requestor in the new data store. Thus, the requestor that determined that the returned value of the allocation counter associated with the active data store exceeded the size of the active data store and waited until a new file is available where data can be written can now write data to the new data store, as long as the returned value of the allocation counter associated with the new data store plus the amount of data requested to be stored by that requestor does not exceed the size of the new data store.

Figure 5A:
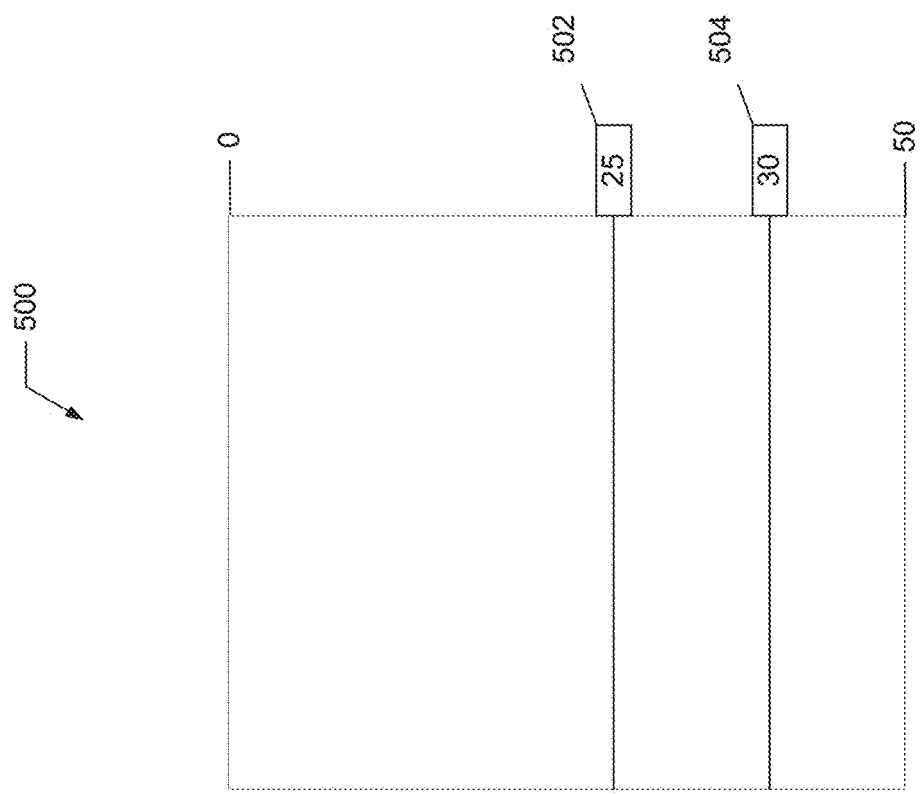

FIG. 5A illustrates an example data store 500. Example data store 500 has a file size of 50 bytes, as shown in FIG. 5A. The file size may be configurable by the system, so that the maximum file size for any given application may be specified by the system. The disclosed embodiments help ensure that the data store file size (i.e., the amount of data actually written to the file) does not exceed the specified maximum file size. In the example of FIG. 5A, data is written to the data store 500 and illustrated as being written from the top to the bottom, e.g., from the address of 0 at the top to the address of 50 at the bottom.

Data store 500 is associated with an acknowledgement counter 502 and an allocation counter 504. In the example of FIG. 5A, the acknowledgement counter is at an address of 25 and the allocation counter is at an address of 30. The acknowledgement counter is indicative of the address where data has actually been written in the data store. The allocation counter is indicative of which portions of the data store 500 have been allocated for data storage, even if all of those indicated portions do not yet contain/store data. Accordingly, it should be understood that the value of the allocation counter may be the same as the value of the acknowledgement counter but may not be less than the value of the acknowledgement counter. In other words, the data store's allocation counter may allocate space within the data store that should be written to in the future, but is empty at a given time. In FIG. 5A, data has been written in the portion of data store 500 from the address of 0 to 25, and the portion of data store 500 from the address of 0 to 30 has been allocated to requestors/data write requests.

The data storage system may continue to write data to the data store 500. For example, the data storage system may continue to write data from previously received requests. As shown in FIG. 5B, the allocation counter 504 is still at 30 (because no additional space has been allocated, compared to FIG. 5A), but the acknowledgement counter 502 has moved from 25 (FIG. 5A) to 28 (FIG. 5B) (because 3 bytes of data have been written to the data store compared to FIG. 5A).

The data storage system may receive requests to write data to the data store 500. As also shown in FIG. 5B, the data storage system receives a request 506 from requestor 0 to write 5 bytes of data.

Figure 5C:
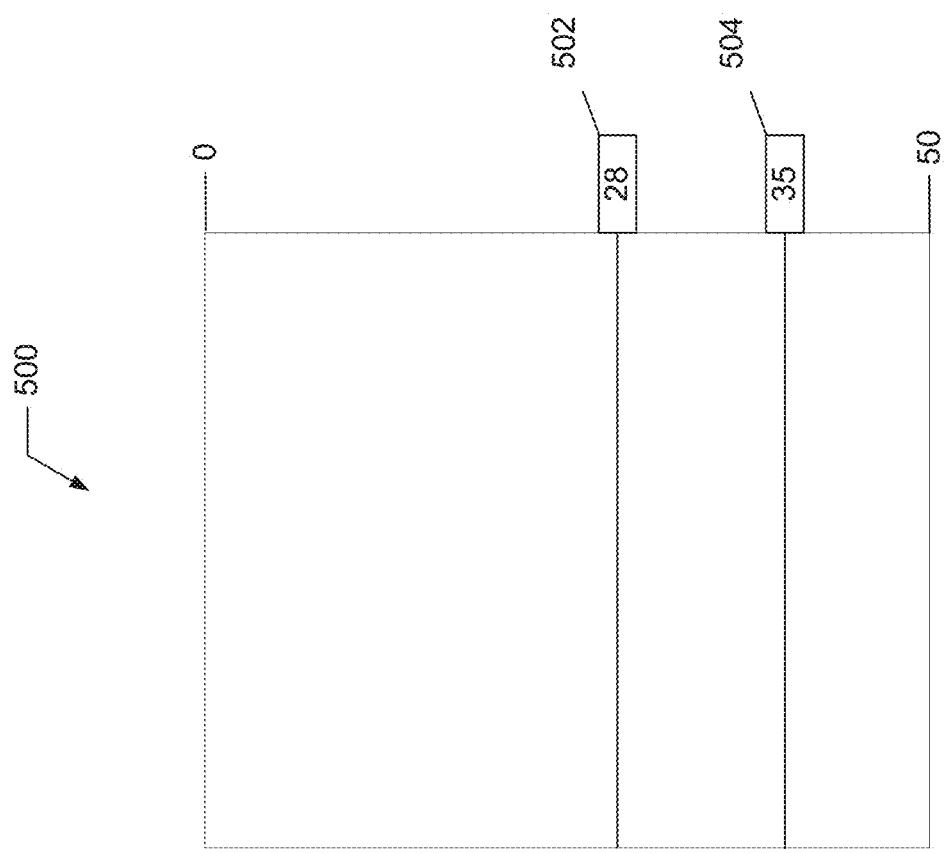
Figure 5D:
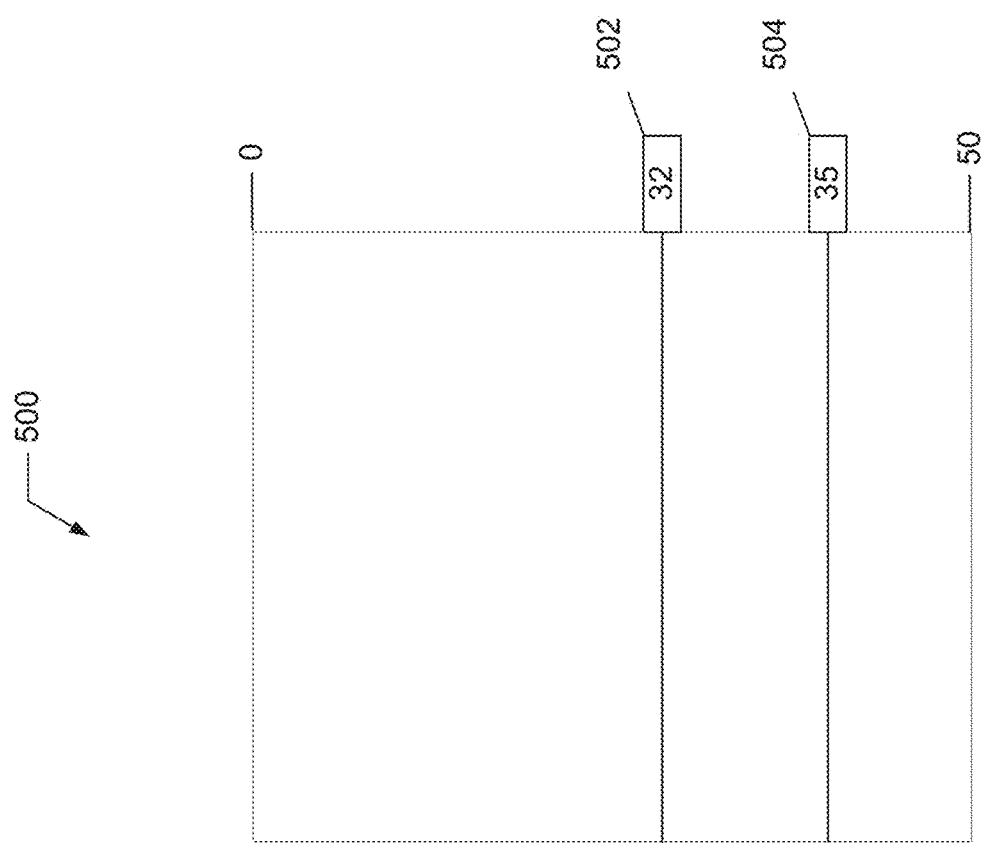

Upon receiving the request 506, the allocation counter 504 is incremented by 5 bytes, as shown in FIG. 5C. In FIG. 5C, the allocation counter 504 has increased to 35. The data storage system may then continue to write data (either from request 506, or some other previously received request) to the data store 500. The acknowledgement counter 502 may then continue to indicate where the data has been written to in the data store 500. For example, in FIG. 5D, the allocation counter 504 still indicates that space up to address 35 has been allocated (compared to FIG. 5C), but allocation counter 502 indicates that compared to FIG. 5C, 4 more bytes have been written to the data store (as indicated by the change from 28 to 32 for the allocation counter 502).

Figure 5E:
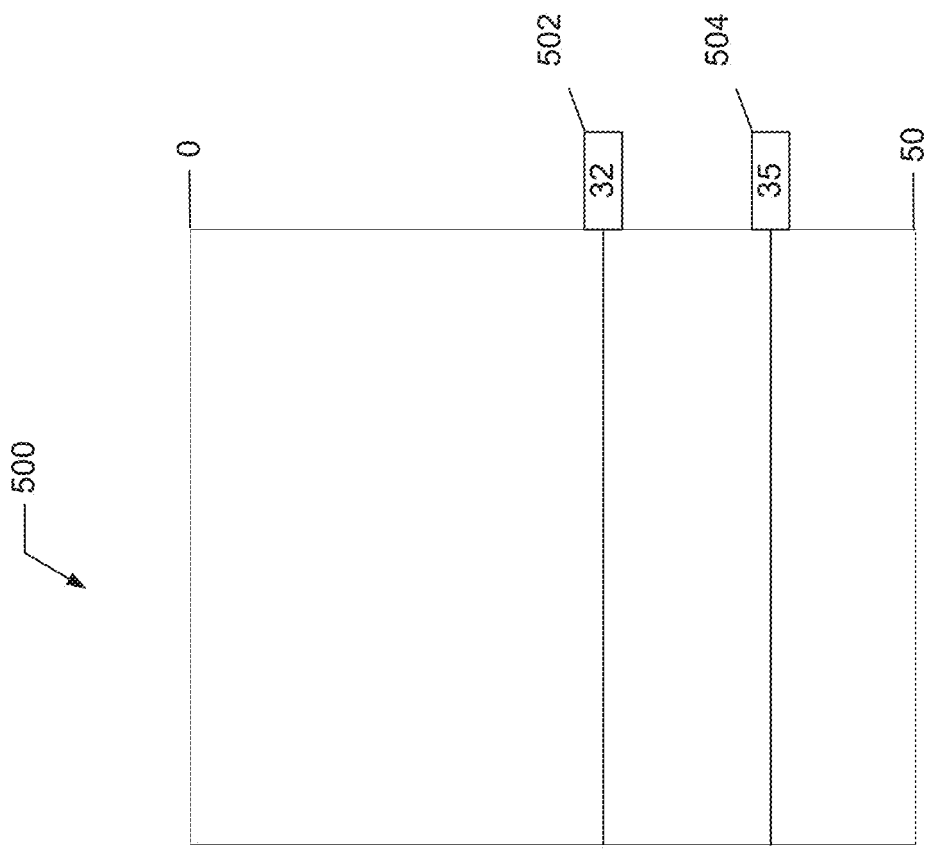

Data store 500 may receive additional requests to write data. For example, data store 500 may receive a plurality of requests from various requestors concurrently to write data to the same common data store 500. As shown in FIG. 5E, the system receives another request 508 from requestor 1 to write 17 bytes of data to data store 500. However, the data store only has a remaining available capacity of 15 bytes (50 byte file size minus allocation counter 504 address of 35 bytes).

Even though request 508 will not fit in the data store 500, the data storage system increases the allocation counter 504 based on request 508. As shown in FIG. 5F, the allocation counter 504 is increased by 17, to a value of 52 (i.e., 35+17=52). Thus, it should be appreciated that the value of the allocation counter 504 is updated based on a received request, even if the value of the allocation counter 504 exceeds the total file size of the data store.

Requestor 1 may run an implementation of the disclosed embodiments as discussed below and determine that requestor 1 is the process/thread that should be responsible for rolling the file, as discussed below. In particular, the data storage system returns (not shown) a value of 35, which is the address of allocation counter 504 before receiving request 508, to requestor 1. Requestor 1 uses the information about the value of the allocation counter 504 before the allocation counter 504 was updated based on the request 508 to determine whether requestor 1 should be responsible for rolling the file. For example, requestor 1 may determine that the allocation counter 504 was less than or equal to the file size (i.e., 35 is less than 50) before receiving requestor 1's request 508, and that the allocation counter 504 is greater than the file size (i.e., 52 is greater than 50) after receiving requestor 1's request 508, and should therefore be the thread/request that is responsible for swapping the data store 500 for a new data store.

In one embodiment, the data storage system may return a value of 35 to requestor 1 and update the value of allocation counter 504 to 52 atomically. For example, the data storage system may use a LOCK XADD instruction on Intel® x86 computer systems.

Before the data store is swapped, the system may receive another request, which may be considered concurrent to request 1, request 510 from requestor 2 to write 5 bytes of data, as shown in FIG. 5G. The data storage system may again return the current value of the allocation counter 504, 52, to requestor 2, and atomically update the value of the allocation counter 504 by 5, to 57, as shown in FIG. 5H.

In the disclosed embodiments, even though the data store's remaining available capacity of 15 bytes is enough to fit or store the 5 byte request 510, the data storage system allocates data to requests in the order that the requests were received, and accordingly, the data storage system returns a value of 57 (i.e., 52+5) for the allocation counter to requestor 2.

Requestor 2 may also run an implementation of the disclosed embodiments as discussed below and determine that requestor 2 should not be responsible for rolling the file, as discussed below. In particular, the data storage system returns (not shown) a value of 52, which is the address of allocation counter 504 before receiving request 510, to requestor 2. Requestor 2 uses the information about the value of the allocation counter 504 before the allocation counter 504 was updated based on the request 510 to determine whether requestor 2 should be responsible for rolling the file. For example, requestor 2 may determine that the allocation counter 504 was greater than the file size (i.e., 52 is greater than 50) before receiving requestor 2's request 510, and that the allocation counter 504 is also greater than the file size (i.e., 57 is greater than 50) after receiving requestor 2's request 510, and should not therefore be responsible for swapping the data store 500 for a new data store. Requestor 2 instead determines that it should wait until a new file is available before the data storage system can allocate space to store the 5 bytes associated with request 510. As discussed above, requestor 1 will determine that it should be the thread/request that is responsible for swapping the data store 500 for a new data store.

FIG. 5I illustrates different references to the state of the system as stored by the data storage system 500, requestor 1 state 520, and requestor 2 state 530. As can be seen, different processes/threads or components may have a different overall stored reference of the state of the system, based on the data received by the process/thread or component, when the system state was last refreshed by the process/thread or component, and/or implementation design, e.g., by an application developer.

As should be appreciated, and as shown in FIG. 5I, the actual value of the allocation counter 504 after the data storage system receives requests 508 and 510, but before the data store 500 is swapped out for a new data store, is 57.

However, as shown in FIG. 5I, after the data storage system receives requests 508 and 510, but before the data store 500 is swapped out for a new data store, requestor 1 state 520 has 35 as the value of the allocation counter 504 (before it is updated based on request 508). Requestor 1 can then calculate that the allocation counter 504 will be updated to 35+17=52 based on request 508.

Also, after the data storage system receives requests 508 and 510, but before the data store 500 is swapped out for a new data store, requestor 2 state 530 has 52 as the value of the allocation counter 504 (before it is updated based on request 510). Requestor 2 can then calculate that the allocation counter 504 will be updated to 52+5=57 based on request 510.

Thus, a data store 500 may concurrently receive (e.g., receiving a request before a data store is swapped, or receiving a request before the data storage system has completed handling a previously received request) two requests to store data, and only one thread will determine that it should roll the file, avoiding potential conflicts that can arise from multiple threads attempting to swap the data store. Moreover, as discussed herein, requestors 1 and 2 do not need to implement CAS-type operations to allocate or write data to the data store, improving the efficiency with which a data storage system can respond to and service write requests, thereby improving the overall performance of a computer system.

In one embodiment, a file may be force-rolled by the application on demand (e.g., before the file is full). The disclosed embodiments allow, in many instances, a thread (e.g., 508) to roll to a new file/data store, even if the data store is not completely full. Even if the data store has enough capacity to store the data associated with another received request (e.g., 510), the disclosed embodiments may sacrifice the ability to write to the remaining available capacity of the data store (e.g., the 15 unused bytes of data store 500) in order to gain the technical improvements and efficiencies described herein when the disclosed data storage system is implemented. However, the disclosed embodiments do not necessarily waste the remaining available capacity of the data store when such capacity is unused before the file is rolled, because a thread rolls and cleans a data store only upon determining that the remaining available capacity is not enough to store the amount of data requested to be stored by the rolling thread.

As should be appreciated, the disclosed embodiments may allow multiple processes to cause modification of the allocation counter. For example, the data storage system may update the allocation counter in response to write requests received concurrently.

Figure 6:
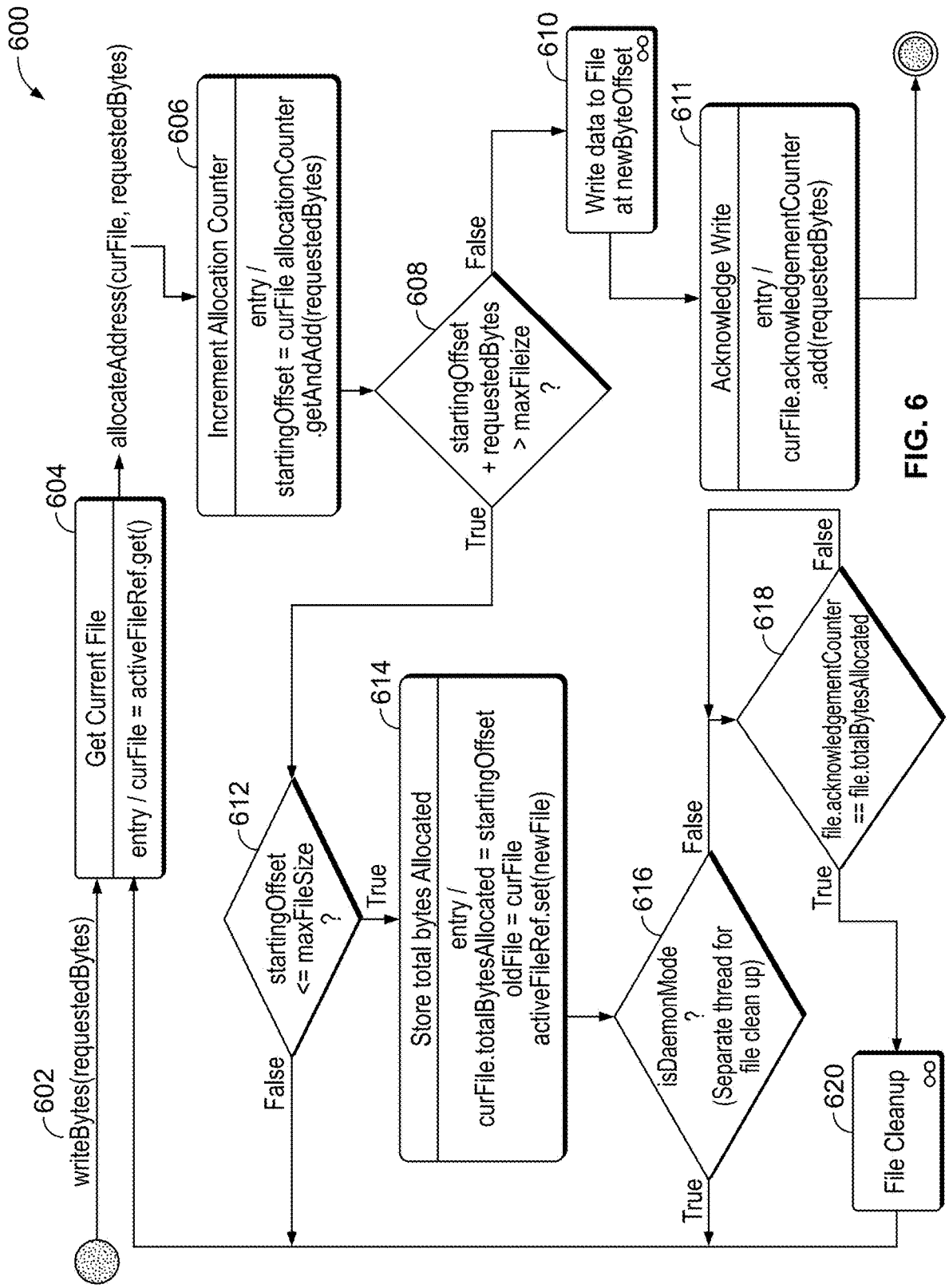
FIG. 6 depicts an example implementation of a data storage system, according to some embodiments.

FIG. 6 illustrates an example implementation of the data storage system 300. The implementation may be a process, an instance of which is initiated with each received request as will be described. As such, multiple instances of the depicted process may be executing at any given time. In the depicted implementation 600, a given requesting process/thread which wishes to store data to a data store 301 that has some remaining available capacity, but not enough remaining available capacity to store the amount of data that the given requesting process/thread wishes to store, is assigned the task of being responsible for swapping the data store 301. This decreases delays in updating the state of data store 301, eliminates the use of instructions that could fail and would need to be repeated, and improves the performance of multi-threaded write operations to a data store 301.

The implementation 600 includes an input 602, which may be implemented by the requestor interface 306, for receiving a request from a requestor, e.g. a process/thread requesting permission to write to the data store 301. The request includes a specification of the number of bytes the requesting process wishes to append to, or store in, the data store 301. Upon receipt of the request, the implementation 600 obtains 604 an indicator of, e.g. pointer to, the current data store 301. Implementation 600 allows for multiple data stores 301 to be in use at a given time, where each active data store is identified by an indicator, e.g. a pointer, which identifies at least the starting location where the identified data store 301 is located, e.g. in a memory 204. Once the location of the data store 301 is known, the implementation 600 returns the current value of an allocation counter (e.g., a starting offset) associated with the data store 301 to the requester and also, atomically, increments 606 the allocation counter by the amount of data requested to be stored by the requestor. In other words, the value for the allocation counter returned to the requestor is the value of the allocation counter before the allocation counter is incremented with the amount of data requested to be stored by the requestor. The implementation 600 then determines 608 whether the starting offset (e.g., before the allocation counter was incremented by the amount of data requested to be stored) plus the amount of data requested to be stored is greater than the maximum file size of the data store 301.

If the starting offset plus the amount of data requested to be stored is less than the maximum file size of the data store 301, the implementation 600 allows 610 the requesting thread/process to write its data in the allocated space of the data store 301. Once the requesting thread/process has completed its storage of the data, it will acknowledge to the implementation 600 that it has completed writing, upon receipt of which, the implementation 600 will account 611 for the cumulative number of bytes of data actually written to the data store 301, e.g. by accumulating or otherwise incrementing the acknowledgment counter by the requested number of bytes.

If the starting offset plus the amount of data requested to be stored is greater than the maximum file size of the data store 301, the implementation 600 then determines 612 whether the starting offset (e.g., before the allocation counter was incremented by the amount of data requested to be stored) is less than or equal to the maximum file size of the data store 301.

If the starting offset is greater than the maximum file size of the data store 301, the implementation 600 returns to the input stage. For example, the implementation may attempt to write to the currently active file again e.g., it may refresh its view of the currently active file and may attempt to write to what it determines to be the currently active file.

If the starting offset is less than or equal to the maximum file size of the data store 301, the implementation 600 determines that the requesting thread is the thread that should be responsible for cleaning up of the data store 301, and stores 614 the starting offset as a total bytes allocated. Because the implementation has previously determined (at 608) that the number of bytes of data requested to be written will not fit in the current data store 301, a new data store 301 must be created or otherwise provided, referred to as a "roll" or "rolling the data store".

The implementation 600 then determines 616 if the requestor should clean up the data store 301, or if a separate (e.g., some other) thread should clean up the data store 301.

If the requestor should clean up the data store 301, the implementation 600 then 618 waits until the acknowledgment counter associated with the data store 301 reaches the stored total bytes allocated, to ensure that all the allocated data is actually written to the data store 301. In other words, the implementation 600 checks the cumulative number of bytes actually written (e.g., indicated by the acknowledgment counter) to the current data store 301 against the stored total bytes allocated to determine whether any other threads/processes, previously approved to store data, are still in the process of storing their data in the current data store 301. If the cumulative number of bytes written does not equal the number of allocated bytes, then another thread/process must still be storing its data and the implementation 600 waits until it is determined that all other process/threads have completed storing their data to the current data store 301, i.e. that the cumulative number of bytes written (e.g., acknowledgment counter) equals the number of bytes allocated (e.g., the stored total bytes allocated). After the acknowledgment counter associated with the data store 301 reaches the stored total bytes allocated, the data store 301 is closed 620 and the implementation 600 returns to the input stage.

If a separate thread, e.g., a dedicated cleaning thread, should clean up the data store 301, the separate thread may also perform checks (not shown) similar to the checks in 618 before cleaning the file. It should be appreciated that it may be advantageous to delegate cleaning a data store to a dedicated cleaning process, so that the thread that writes data associated with an application (e.g., requestor 1) is not slowed down by the task of cleaning a data store.

Figure 7:
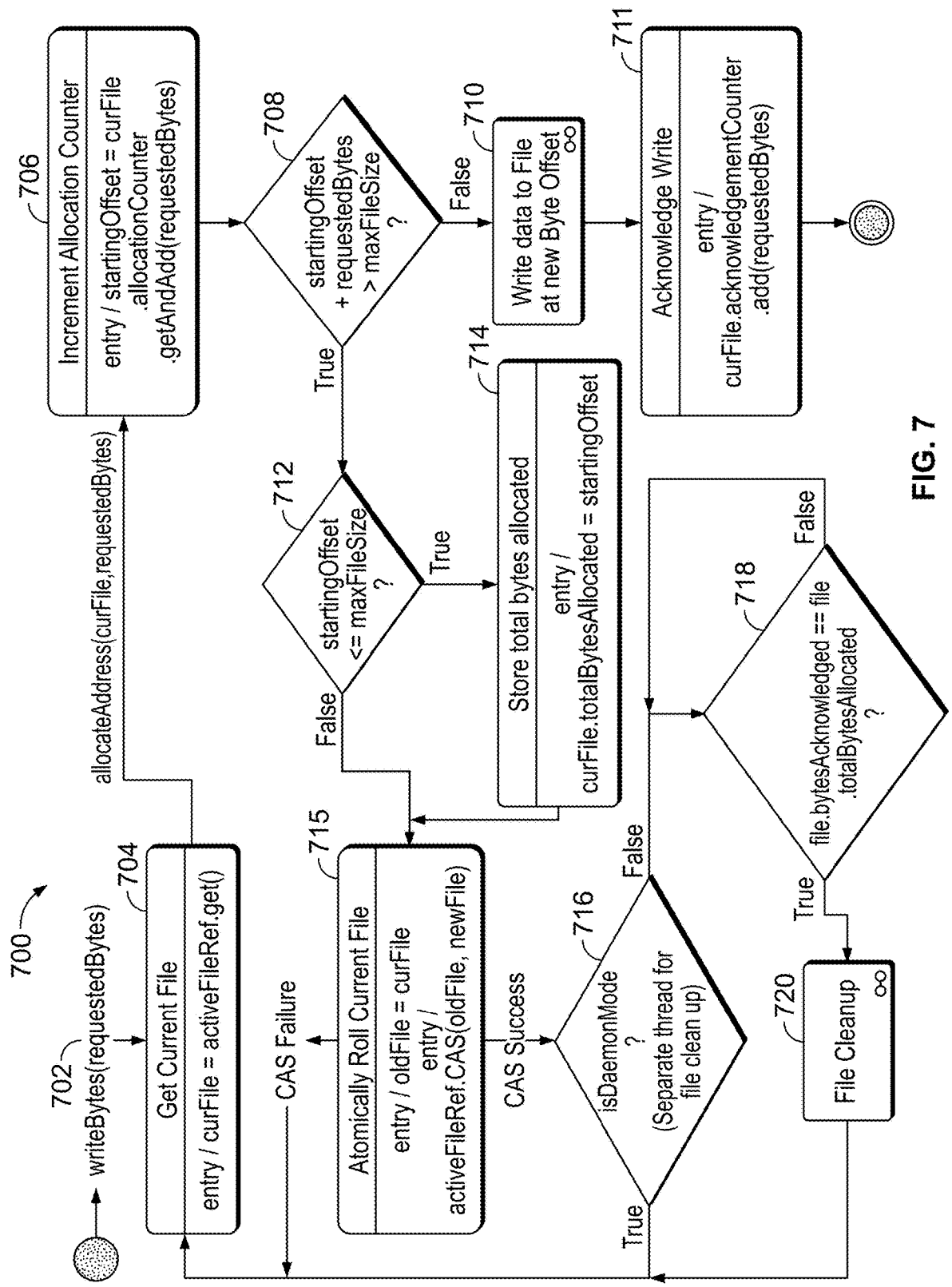
FIG. 7 depicts another example implementation of a data storage system, according to some embodiments.

FIG. 7 illustrates another example implementation 700 of the data storage system 300. Similar to implementation 600, implementation 700 may be a process, an instance of which is initiated with each received request as will be described. As such, multiple instances of the depicted process 700 may be executing at any given time. In the depicted implementation 700, unlike implementation 600, a process/thread implements one CAS-type operation to swap old/used files. Like implementation 600, a process/thread in implementation 700 does not implement CAS-type operations to allocate data, or to write data to the data store, thereby attaining the benefits of avoiding CAS-type operations described herein.

The implementation 700 includes an input 702, which may be implemented by the requestor interface 306, for receiving a request from a requestor, e.g. a process/thread requesting permission to write to the data store 301. The request includes a specification of the number of bytes the requesting process wishes to append to, or store in, the data store 301. Upon receipt of the request, the implementation 700 obtains 704 an indicator of, e.g. pointer to, the current data store 301. Implementation 700 allows for multiple data stores 301 to be in use at a given time, where each active data store is identified by an indicator, e.g. a pointer, which identifies at least the starting location where the identified data store 301 is located, e.g. in a memory 204. Once the location of the data store 301 is known, the implementation 700 returns the current value of an allocation counter (e.g., a starting offset) associated with the data store 301 to the requester and also, atomically, increments 706 the allocation counter by the amount of data requested to be stored by the requestor. In other words, the value for the allocation counter returned to the requestor is the value of the allocation counter before the allocation counter is incremented with the amount of data requested to be stored by the requestor. The implementation 700 then determines 708 whether the starting offset (e.g., before the allocation counter was incremented by the amount of data requested to be stored) plus the amount of data requested to be stored is greater than the maximum file size of the data store 301.

If the starting offset plus the amount of data requested to be stored is less than the maximum file size of the data store 301, the implementation 700 allows 710 the requesting thread/process to write its data in the allocated space of the data store 301. Once the requesting thread/process has completed its storage of the data, it will acknowledge to the implementation 700 that it has completed writing, upon receipt of which, the implementation 700 will account 711 for the cumulative number of bytes of data actually written to the data store 301, e.g. by accumulating or otherwise incrementing the acknowledgment counter by the requested number of bytes.

If the starting offset plus the amount of data requested to be stored is greater than the maximum file size of the data store 301, the implementation 700 then determines 712 whether the starting offset (e.g., before the allocation counter was incremented by the amount of data requested to be stored) is less than or equal to the maximum file size of the data store 301.

If the starting offset is greater than the maximum file size of the data store 301, the implementation 700 attempts 715 to atomically roll/swap the currently active data store 301. Step 715 of implementation 700 may rely upon a CAS-type operation to swap the active data store, namely, to determine whether the active data store identifier that a requestor has is the correct identifier for the active file (e.g., to ensure no other process/thread has swapped the data store between the time the given requestor obtained the active data store identifier at step 704 and the time that the given requestor attempts to swap the data store at step 715).

If a given requestor's active data store identifier (obtained in step 704) matches the active data store identifier obtained in step 715, that given requestor is then allowed to process to step 716.

If a given requestor's active data store identifier (obtained in step 704) does not match the active data store identifier obtained in step 715, that given requestor may return to step 704 (e.g., a CAS failure) and attempt to write the data again, as shown in FIG. 7.

If the starting offset is less than or equal to the maximum file size of the data store 301, the implementation 700 determines that the requesting thread is the thread that should be responsible for cleaning up of the data store 301, and stores 714 the starting offset as a total bytes allocated. Because the implementation has previously determined (at 708) that the number of bytes of data requested to be written will not fit in the current data store 301, a new data store 301 must be created or otherwise provided, referred to as a "roll" or "rolling the data store".

The implementation 700 then attempts 715 to atomically roll the currently active data store 301. Step 715 is then processed as discussed above. As can be seen, two different requestors may arrive at step 715 in two different processing paths: 712 to 715, and 714 to 715. Thus, step 715 runs the CAS type operation discussed above. Unlike implementation 700, implementation 600 does not include two different ways for two different requestors to arrive at a data swapping step.

The implementation 700 then determines 716 if the requestor should clean up the data store 301, or if a separate (e.g., some other) thread should clean up the data store 301.

If the requestor should clean up the data store 301, the implementation 700 then 718 waits until the acknowledgment counter associated with the data store 301 reaches the stored total bytes allocated, to ensure that all the allocated data is actually written to the data store 301. In other words, the implementation 700 checks the cumulative number of bytes actually written (e.g., indicated by the acknowledgment counter) to the current data store 301 against the stored total bytes allocated to determine whether any other threads/processes, previously approved to store data, are still in the process of storing their data in the current data store 301. If the cumulative number of bytes written does not equal the number of allocated bytes, then another thread/process must still be storing its data and the implementation 700 waits until it is determined that all other process/threads have completed storing their data to the current data store 301, i.e. that the cumulative number of bytes written (e.g., acknowledgment counter) equals the number of bytes allocated (e.g., the stored total bytes allocated). After the acknowledgment counter associated with the data store 301 reaches the stored total bytes allocated, the data store 301 is closed 720 and the implementation 700 returns to the input stage.

If a separate thread, e.g., a dedicated cleaning thread, should clean up the data store 301, the separate thread may also perform checks (not shown) similar to the checks in 718 before cleaning the file. It should be appreciated that it may be advantageous to delegate cleaning a data store to a dedicated cleaning process, so that the thread that writes data associated with an application (e.g., requestor 1) is not slowed down by the task of cleaning a data store.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
   receiving, by a data storage controller from a thread of a plurality of threads executed on one or more processors, a request to store an amount of data in an active data file characterized by a total capacity and a remaining capacity thereof;
   determining, by the controller, that the amount of data will exceed the remaining capacity and, based thereon, transmitting, by the controller to the thread, a value of an allocation counter associated with the active data file, the value of the allocation counter being indicative of the remaining capacity of the active data file accounting for the amount of data requested to be stored by the thread, the controller responding to a subsequent request to store another amount of data in the active data file from another thread with a different value of the allocation counter indictive of the remaining capacity of the active data file accounting for both the requested amount of data to be stored by the thread and the other requested amount of data to be stored by the other thread, only one thread is enabled to consume the remaining capacity of the active data file when the remaining capacity is insufficient to store both the amount of data and the other amount of data; and
   receiving, by the controller from the thread, data indicative of a determination by the thread that the value of the allocation counter has enabled the thread to determine that there is sufficient remaining capacity to store all of the amount of data requested to be stored in the active data file or a determination by the thread that the value of the allocation counter has enabled the thread to determine that there is insufficient capacity to store all of the amount of data requested to be stored in the active data file and further indicative of the thread having designated a new data file as the active data file and a remaining capacity thereof; and
   wherein upon receipt by the controller from the thread of the designation of a new data file, the controller, in response to a subsequent request to store data, responding with a value of an allocation counter associated with the new data file based on a remaining capacity thereof.

2. The computer implemented method of claim 1, wherein the thread and other thread may concurrently store data to the active data file without contention when the remaining capacity thereof is sufficient to store both the amount of data and the other amount of data.

3. The computer implemented method of claim 1, wherein the thread from which the designation was transmitted stores a portion of the data requested thereby in the active data file which fits within the remaining capacity thereof.

4. The computer implemented method of claim 1, wherein the allocation counter is indicative of portions of the active data file that have been allocated for data storage in response to requests to store amounts of data, the active data file being further associated with an acknowledgment counter indicative of portions of the active data file which currently store data, the acknowledgment counter being updated upon data being stored in the active data file.

5. The computer implemented method of claim 1, wherein each thread is one of a plurality of logging threads which record data indicative of interrelated operations of one or more portions of a transaction processing system.

6. The computer implemented method of claim 1, further comprising, causing, by the thread, switching from the active data file to the new data file, the new data file being thereby designated as the active data file, upon receipt of the transmitted designation.

7. The computer implemented method of claim 1, further comprising causing, by a separate cleaning thread, the data file previously designated as the active data file to be cleaned.

8. The computer implemented method of claim 7, further comprising causing, by the separate cleaning thread, waiting until all the data from all prior requests has been stored in the data file previously designated as the active data file before causing the data file previously designated as the active data file to be cleaned.

9. The computer implemented method of claim 1, wherein the value of the allocation counter is indicative of a location in the active data file the thread can begin storing the data, other threads thereby being prevented from storing data to the same location.

10. The computer implemented method of claim 1, further comprising:

transmitting, by another thread of the plurality of threads, a request to store an amount of data in the active data file;

determining, by the other thread, that the amount of data requested to be stored by the other thread does not exceed the remaining capacity of the active data file; and commencing storing, by the other thread, data in the active data file regardless of whether any other data is currently being stored in the active data file.

11. The computer implemented method of claim 10, further comprising:

transmitting, by the other thread, a resubmission of a previously submitted request to store data, the resubmitted request being indicative of a determination by the other thread that the amount of data to be stored exceeds the remaining capacity of the active data file.

12. The computer implemented method of claim 11, further comprising:

receiving, by the other thread, a value of an allocation counter, accounting for the requested amount of data to be stored, associated with a new data file;

determining, by the other thread, that the amount of data requested to be stored by the other thread does not exceed the remaining capacity of the new data file; and commencing storing, by the other thread, the data requested to be stored by the other thread in the new data file.

13. A computer system comprising:

a processor;

a non-transitory memory coupled with the processor comprising computer executable instructions which, when executed by the processor, cause the processor to:

receive, from a thread of a plurality of threads executed on one or more processors, a request to store an amount of data in an active data file characterized by a total capacity and a remaining capacity thereof;

determine that the amount of data will exceed the remaining capacity and, based thereon, transmit to the thread, a value of an allocation counter associated with the active data file, the value of the allocation counter being indicative of the remaining capacity of the active data file accounting for the amount of data requested to be stored by the thread, and respond to a subsequent request to store another amount of data in the active data file from another thread with a different value of the allocation counter indictive of the remaining capacity of the active data file accounting for both the requested amount of data to be stored by the thread and the other requested amount of data to be stored by the other thread, only one thread is enabled to consume the remaining capacity of the active data file when the remaining capacity is insufficient to store both the amount of data and the other amount of data; and receive, from the thread, data indicative of a determination by the thread that the value of the allocation counter has enabled the thread to determine that there is sufficient remaining capacity to store all of the amount of data requested to be stored in the active data file or a determination by the thread that the value of the allocation counter has enabled the thread to determine that there is insufficient capacity to store all of the amount of data requested to be stored in the active data file and further indicative of the thread having designated a new data file as the active data file and a remaining capacity thereof; and wherein upon receipt from the thread of the designation of a new data file, the processor, in response to a subsequent request to store data, responds with a value of an allocation counter associated with the new data file based on a remaining capacity thereof.

14. The computer system of claim 13, wherein the thread from which the designation was transmitted, stores a portion of the data requested thereby in the active data file which fits within the remaining capacity thereof.

15. The computer system of claim 13, wherein the allocation counter is indicative of portions of the active data file that have been allocated for data storage in response to requests to store amounts of data, the active data file being further associated with an acknowledgment counter indicative of portions of the active data file which currently store data, the acknowledgment counter being updated upon data being stored in the active data file.

16. The computer system of claim 13, wherein each thread is one of a plurality of logging threads which record data indicative of interrelated operations of one or more portions of a transaction processing system.

17. The computer system of claim 13, wherein the thread causes a switch from the active data file to the new data file, the new data file being thereby designated as the active data file, upon receipt of the transmitted designation.

18. The computer system of claim 13, wherein a separate cleaning thread causes the data file previously designated as the active data file to be cleaned.

19. The computer system of claim 18, wherein the separate cleaning thread causes waiting until all the data from all prior requests has been stored in the data file previously designated as the active data file before causing the data file previously designated as the active data file to be cleaned.

20. The computer system of claim 13, wherein the value of the allocation counter is indicative of a location in the active data file the thread can begin to store the data, other threads thereby prevented from storing data to the same location.

21. The computer system of claim 13, wherein the thread and other thread may concurrently store data to the active data file without contention when the remaining capacity thereof is sufficient to store both the amount of data and the other amount of data.

22. The computer system of claim 13, wherein another thread:

transmits a request to store data in the active data file;

determines that the amount of data requested to be stored by the other thread does not exceed the remaining capacity of the active data file; and commences storage of the data in the active data file regardless of whether any other data is currently being stored in the active data file.

23. The computer system of claim 22, wherein the other thread transmits a resubmission of a previously submitted request to store data, the resubmitted request being indicative of a determination by the other thread that the amount of data to be stored exceeds the remaining capacity of the active data file.

24. The computer system of claim 23, wherein the other thread:

receives a value of an allocation counter, accounting for the requested amount of data to be stored, associated with a new data file;

determines that the amount of data requested to be stored by the other thread does not exceed the remaining capacity of the new data file; and commences storage of the data requested to be stored by the other thread in the new data file.

25. A computer system comprising:

means for receiving, from a thread of a plurality of threads executed on one or more processors, a request to store an amount of data in an active data file characterized by a total capacity and a remaining capacity thereof;

means for determining that the amount of data will exceed the remaining capacity and, based thereon, transmitting, to the thread, a value of an allocation counter associated with the active data file, the value of the allocation counter being indicative of the remaining capacity of the active data file accounting for the amount of data requested to be stored by the thread, and responding to a subsequent request to store another amount of data in the active data file from another thread with a different value of the allocation counter indictive of the remaining capacity of the active data file accounting for both the requested amount of data to be stored by the thread and the other requested amount of data to be stored by the other thread, only one thread is enabled to consume the remaining capacity of the active data file when the remaining capacity is insufficient to store both the amount of data and the other amount of data; and means for receiving, from the thread, data indicative of a determination by the thread that the value of the allocation counter has enabled the thread to determine that there is sufficient remaining capacity to store all of the amount of data requested to be stored in the active data file or a determination by the thread that the value of the allocation counter has enabled the thread to determine that there is insufficient capacity to store all of the amount of data requested to be stored in the active data file and further indicative of the thread having designated a new data file as the active data file and a remaining capacity thereof; and wherein upon receipt from the thread of the designation of a new data file, in response to a subsequent request to store data, responding with a value of an allocation counter associated with the new data file based on a remaining capacity thereof.

\* \* \* \* \*